United States Patent [19]

Kolliker et al.

[11] 3,900,496
[45] Aug. 19, 1975

[54] ANTHRAQUINONE DYESTUFFS

[75] Inventors: Hans Peter Kolliker, Munchenstein;
Urs Karlen, Magden; Peter Hindermann, Bottmingen, all of Switzerland

[73] Assignee: Ciba-Geigy AG, Basel, Switzerland

[22] Filed: Aug. 20, 1973

[21] Appl. No.: 389,824

[30] Foreign Application Priority Data
Aug. 22, 1972 Switzerland.................... 12431/72

[52] U.S. Cl............... 260/326 C; 260/379; 260/380
[51] Int. Cl.².......................................... C07D 27/00
[58] Field of Search............ 260/326 D, 326 C, 379, 260/380

[56] References Cited
UNITED STATES PATENTS

| | | | |
|---|---|---|---|
| 3,636,065 | 1/1972 | Ciba..................................... | 260/376 |
| 3,689,510 | 9/1972 | Kolliker et al..................... | 260/376 |
| 3,767,680 | 10/1973 | Kolliker et al..................... | 260/372 |
| 3,803,168 | 4/1974 | Kolliker et al.................. | 260/326 C |

FOREIGN PATENTS OR APPLICATIONS

| | | | |
|---|---|---|---|
| 1,570,934 | 5/1969 | France............................... | 260/380 |
| 2,015,587 | 10/1970 | Germany........................... | 260/380 |

*Primary Examiner*—Elbert L. Roberts
*Attorney, Agent, or Firm*—Joseph G. Kolodny; Prabodh I. Almaula; Edward McC. Roberts

[57] ABSTRACT

New anthraquinone disperse dyestuff of sparing aqueous solubility, of the formula I A−Y−O−COSR(I) wherein A is the radical of an anthraquinone dyestuff, Y is an alkylene or aralkylene bridge which is bonded to the anthraquinone nucleus directly or through a bridge member and which is optionally substituted by a hydroxyl group and/or is interrupted by an oxygen atom, and R is an optionally substituted aliphatic, cycloaliphatic, or aromatic radical. The new dyestuffs dye polyester fibers in fast blue shades.

12 Claims, No Drawings

ANTHRAQUINONE DYESTUFFS

The present invention relates to new anthraquinone dyestuffs of sparing aqueous solubility which are useful as disperse dyes, a process for their manufacture, the use of the new anthraquinone dyestuffs for dyeing hydrophobic organic fibre material, in particular textile fibres made from linear polyesters which are produced by the condensation of aromatic polycarboxylic acids with polyhydric alcohols, or from cellulose esters, and to the fibre material in the form of an industrial product dyed with the new dyestuffs.

The invention is based on the observation that valuable new anthraquinone dyestuffs of sparing aqueous solubility of the formula I

A — Y — O — COSR (I)

wherein A is the radical of an anthraquinone dyestuff, Y is an alkylene or aralkylene bridge which is bonded to the anthraquinone nucleus directly or through a bridge member and which is optionally substituted by a hydroxyl group and/or is interrupted by an oxygen atom, and R is an optionally substituted aliphatic, cycloaliphatic or aromatic radical, are obtained a. by reacting a compound of the formula Ia

A — Y — OH (Ia)

with a compound of the formula Ib

Hal — COSR (Ib)

wherein A, Y, and R have the meanings given hereinabove, or b. if Y is bonded to A through a —NH bridge and represents aralkylene, by reacting an anthraquinone compound of the formula Ic

A — V (Ic)

wherein V represents a replaceable substituent, especially a halogen atom, with a compound of the formula Id

H — Y — O — COSR (Id)

with an anthraquinone-imine which has a hydrogen atom in 2-position by oxidation.

The starting materials herein are so chosen that the resulting anthraquinone dyestuff is free from water-solubilising groups which exhibit acid dissociation in water, i.e., that it contains, for example, no sulphonic, carboxylic, or phosphoric acid groups. A preferred process for the manufacture of anthraquinone dyestuffs of sparing aqueous solubility, of the formula II

A' — Y — COSR (II)

wherein Y and R have the meanings given hereinbefore and A' represents the radical of an anthraquinone dyestuff which in at least one β-position is bonded to Y directly or through a bridge member, consists in reacting a compound of the formular IIa

A' — Y — OH (IIy)

with a compound of the formula Ib

Hal — COSR (Ib)

wherein A', Y, and R have the meanings given hereinbefore.

The anthraquinone compounds which can be used as starting materials and which in at least one β-position contain a hydroxyalkyl radical bonded to the anthraquinone nucleus directly or through a bridge member, can belong both to the series of actual anthraquinonyl compounds and those of the higher condensed derivatives, e.g., to the group of the anthrapyridinyl compounds.

Besides the substituent Y — O — COSR in β-position, the anthraquinone nucleus can contain still further substituents, for example, primary amino groups or secondary amino groups which can be substituted by a lower alkyl group, for example the methyl, isopropyl, or sec. butyl group, a cycloalkyl group, for example the cyclohexyl group, a mono- or binuclear aryl group, for example the phenyl, chlorophenyl, methylphenyl, methoxyphenyl, 2,4,6-trimethylphenyl group or phenoxyphenyl group or phenylazophenyl group, as well as by hydroxy, cyano, or nitro groups or also by halogens, for example fluorine, chlorine, or bromine.

The anthraquinone radical A' can be linked with Y directly or through a divalent or trivalent bridge member. Divalent bridge members can contain divalent atoms such as oxygen or sulphur, or divalent groups which contain heteroatoms, for example a —CONH—, —COO—, —(O-alkylene)$_{1-3}$—O—, —O-alkylene-O-arylene—, —S-alkylene-O—, —arylene-O, —O-arylene—, —S-arylene-, —O-arylene-O—, —O-alkylene-, O-arylene-O—, —S-arylene-O—, —NH-arylene, —NH-arylene-, —NH-arylene-O— or —COO-alkylene-O—, the —SO$_2$—, —SO$_2$—O—, —SO$_2$-NH—SO$_2$—, —SO$_2$N—O-arylene-SO$_2$NH— or —S-arylene—SO$_2$NH group (wherein R' represents hydrogen or lower alkyl radical and the arylene radical is optionally substituted by halogen or lower alkyl groups). A suitable trivalent bridge member is especially the o-dicarboxylic imide group.

The alkylene group contains preferably at most 4 carbon atoms and can be straight-chain or branched. In the former case it is preferably the 1,2-ethylen or 1,3-propylene group, and in the latter also the 2-methyl-1,3-propylene or 2,2-dimethyl-1,3-propylene group. If it is substituted by a hydroxyl group, it is in particular the 2-hydroxy-1,3-propylene group.

If R represents an aliphatic radical, it is for example a straight-chain or branched-chain optionally substituted alkyl or alkylene group (in the latter case especially a Δ$^2$-alkylene group) with preferably up to 5 carbon atoms. As substituents these aliphatic radicals, especially the alkyl groups, can contain e.g., halogens, for example chlorine or bromine, or a lower alkoxy group, and also a carbocyclic ring, particularly of aromatic character, for example the phenyl radical, or heterocyclic rings, for example the thienyl-(2), furyl-(2) or tetrahydrofuryl-(2) radical.

Examples of suitable cycloaliphatic groups represented by R are cycloalkyl groups with preferably 5- or 6-membered rings and, in particular, the cyclohexyl or methylcyclohexyl group.

If R represents an aromatic radical, then this radical belongs preferably to the benzene series; it can contain customary non-ionogenic ring substituents. As examples of such substituents there may be cited halogens, for example fluorine, chlorine, or bromine, or lower alkyl groups, for example the methyl group.

Most of the starting materials of the formula Ia are known and can be manufactured by methods which are known per se. Those in which the radical A' is linked with Y through oxygen, sulphur, an

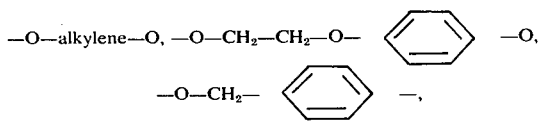

O-alkylene-cycloalkylene-alkylene-O group can be obtained, e.g., according to the process of German Auslegeungschrift No. 1.209.680 or British Pat. No. 974,404, wherein, for example, an anthraquinone compound of the formula

A' — W in which A' represents a β-anthraquinonyl radical and W represents halogen, the sulphonic acid group or a phenoxy group, is reacted with a compound of the formula $HX_o$ — Q — Y — OH in which Y has the meaning given under the formula I and $X_o$ represents oxygen or sulphur and Q represents the direct bond or a divalent hydrocarbon radical which is optionally interrupted by oxygen.

As examples of anthraquinone compounds of the formula A' — W there may be cited 1-amino-2-bromo-anthraquinone, 1,4-diamino-2-bromo-anthraquinone, 1-amino-4-hydroxy-2-bromo- or -2-chloro-anthraquinone, 1-amino-4-hydroxy-2-phenoxy-anthraquinone, 1-amino-4-hydroxy-anthraquinone-2-sulphonic acid, 1-amino-4-phenylamino-anthraquinone-2-sulphonic acid, 1-amino-4-cyclohexylamino-anthraquinone-2-sulphonic acid, 1-amino-4-hydroxy-2-p-methoxyphenoxyanthraquinone. Suitable examples of compounds $HX_o$-Q-Y-OH are glycols, for example ethylene glycol, 1,3-propylene glycol, 2,2-diethyl-dihydroxypropane(1,3), cyclohexane dimethanol, cyclohexane diethanol, cyclohexane di-n-butanol, 2,5-bis-(hydroxy-methyl)-tetrahydrofuran, 2,5-bis(β-hydroxyethyl)-tetrahydrofuran, di-(β-hydroxyethoxy)benzene, also m- or p-(β-hydroxyethoxy)-phenol, β-(p-hydroxyphenyl)-ethyl alcohol, m-hydroxy-benzyl alcohol, mercaptoalkyl alcohols, for example 2-mercaptoethanol, 3-mercapto-1-propanol or 4-mercapto-1-butanol.

Starting materials of the formula Ia, in which Y is bonded to A through a —SO₂NH or —CONH group or through an —O-arylene-SO₂NH, —O-arylene-CONH, S-arylene-SO₂NH or S-arylene-CONH group, can be obtained by reacting a halide of the formula A' — $Q_o$ — $X_1$ — Hal in which A' represents a β-anthraquinonyl radical, $Q_o$ represents the direct bond or an arylene group which is bonded to A' through an oxygen or sulphur atom, $X_1$ represents the —CO or —SO₂ bond and Hal represents a chlorine or bromine, with an amine of the formula

NH₂ — Y — OH.

As examples of halides there may be mentioned: 1-amino-anthraquinone-2-carbonylchloride, 1-amino-4-phenylamino-anthraquinone-2-carbonylchloride, 1-amino-4-hydroxy-anthraquinone-2-phenoxy-3'-carbonylchloride, 1-amino-4-hydroxyanthraquinone-2-phenoxy-4'-sulphonylchloride or 1-amino-4-hydroxy-anthraquinone-2-phenylthio-4'-sulphonylchloride and as amines of the formula NH₂—Y—OH there may be mentioned for example ethanolamine or 1,3-propanolamine.

The manufacture of the anthraquinone compounds of the formula Ia, in which Y represents a methylene group which is bonded to the anthraquinone nucleus A' directly or through a phenoxy group, is described, e.g., in French Pat. No. 1.530.985.

As examples of such starting materials of the formula Ia there may be cited:
1,4-diamino-2-hydroxymethylanthraquinone, 1,4-dihydroxy-2-hydroxymethylanthraquinone, 1-amino-2-hydroxymethyl-4-phenylamino-anthraquinone and 1-hydroxy-2-hydroxymethyl-4-phenylamino-anthraquinone.

The halogen-substituted formic acid thioesters of the formula Ib are also for the most part known. Such esters are, for example, alkyl-, alkenyl-, cyclo-alkyl- or arylthioesters of halogen-substituted formic acid, e.g., methylthioesters, ethylthioesters, isopropylthioesters, amylthioesters, alkylthioesters, cyclohexylthioesters, γ-chloropropylthioesters, phenylthioesters or 2,4-dimethylphenylthioesters, 4-chlorophenylthioesters of chloroformic acid, and also the corresponding bromine derivatives.

The reaction of the anthraquinone compounds of the formula Ia with the thioesters of the halogen substituted formic acid takes place advantageously at low temperatures (0°–50°C) in the presence of acid acceptors and optionally in the presence of inert solvents.

Suitable acid acceptors are in particular tertiary nitrogen bases, e.g., pyridine, picoline, quinoline, lipidine, aliphatic amines, e.g., trimethylamine and triethylamine, anilines, e.g., N,N-diethylaniline, also alkali metal or alkaline earth metal carbonates, hydrogen carbonates or hydroxides, e.g., sodium hydrogen carbonate, potassium carbonate, barium carbonate, sodium hydroxide or barium hydroxide. Suitable inert organic solvents are optionally halogenated or nitrated aromatic hydrocarbons, e.g., toluene, xylene, chlorobenzene, dichlorobenzene or nitrobenzene, also aliphatic halogenated hydrocarbons, e.g., chloroform, carbon tetrachloride or tetrachloroethane, also lower aliphatic ketones, e.g., acetone, and cyclic ether, e.g., dioxan or tetrahydrofuran.

Anthraquinone dyestuffs of the formula I, wherein the RSOC group is bonded to the anthraquinone nucleus through a —NH-arylene or —NH-aryleneoxy or —NH-arylenethio group, and which correspond to the formula III $$A'_o — NH — arylene — Q' — Y — O — COSR$$ (III)

wherein $A'_o$ represents a β-anthraquinonyl radical which possesses a hydroxyl group in the adjacent α-position, "arylene" represents a benzene radical which is optionally substituted by halogen or lower alkyl groups, $Q'$ represents the direct bon, oxygen, or sulphur, can also be manufactured by reacting a compound of the formula IIIa $$A'_o — Hal$$ (IIIa)

wherein "Hal" represents chlorine or bromine, with a compound of the formula IIIa $$H_2N—arylene—Q'—Y—O—COSR$$ (IIIb)

Most of the β-haloanthraquinone compounds of the formula IIIa which can be used according to the invention are known. As examples there may be cited: 1-hydroxy-2-bromo-anthraquinone, 1,4-dihydroxy-2-bromo-anthraquinone, and 1,4-dihydroxy-2-chloro-anthraquinone.

These amines of the formula IIIb which are reacted with the compounds of the formula IIIa can be manufactured by methods known per se, for example by reacting a nitro compound of the formula $$NO_2 — arylene — Q' — Y — O — COSR$$

wherein "arylene," $Q'$, Y, and R have the meanings given hereinbefore, with a thioester of halogen-substituted formic acid of the initially mentioned formula Ib, the reaction being carried out as described hereinbefore, and with subsequent reduction of the nitro to the amino group.

Preferred anthraquinone dyestuffs of the formula I, which are distinguished by good affinity, levelling power, and build-up as well as good fastness to sublimation and light when applied to polyethylene glycol terephthalate fibres, correspond to the formula IV

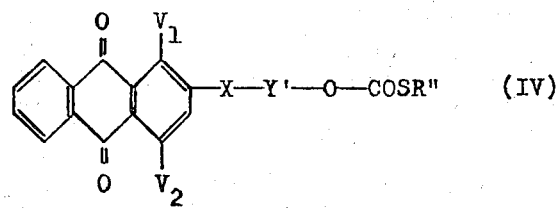

(IV)

wherein $V_1$ represents the hydroxyl or amino group, $V_2$ represents the hydroxyl group or a phenylamino group which is optionally ring substituted by halogen, e.g., chlorine or by a lower alkyl or alkoxy group, X represents oxygen, sulphur, an —O—alkylene—O group, the —CONH or $SO_2NH$ group, $Y'$ represents a lower alkylene group, and $R''$ represents a lower alkyl group or a phenyl radical which is optionally substituted by halogen or lower alkyl groups. They are manufactured by reacting a compound of the formula IVa

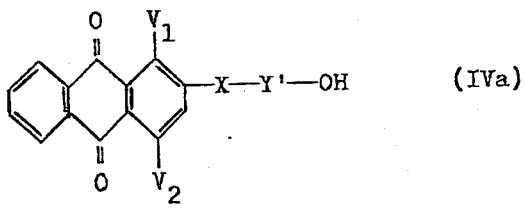

(IVa)

with a compound of the formula IVb $$Hal — COSR''$$ (IVb)

wherein $V_1$, $V_2$, X, $Y'$, Hal, and $R''$ have the indicated meaning. Further anthraquinone dyestuffs according to the invention which are also distinguished by good affinity and levelling power as well as good fastness to light produced by the dyeings therewith on polyester, are those of the formulae V and VI

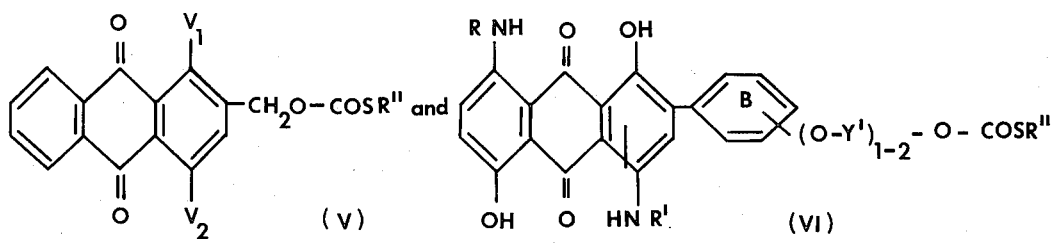

wherein $V_1$, $V_2$, $Y'$, and $R''$ have the meanings given for the formula IV, $R'$ represents hydrogen or a lower alkyl radical and B is optionally further substituted by halogen, lower alkyl, or lower alkoxy groups.

According to the invention they are manufactured by reacting a compound of the formula Va

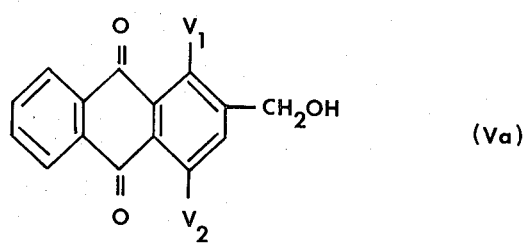

(Va)

with a compound of the formula IVb $$Hal — COSR''$$

wherein $V_1$, $V_2$, Hal, and R have the indicated meanings, or by reacting a disulphonated anthraquinone compound of the formula VIa

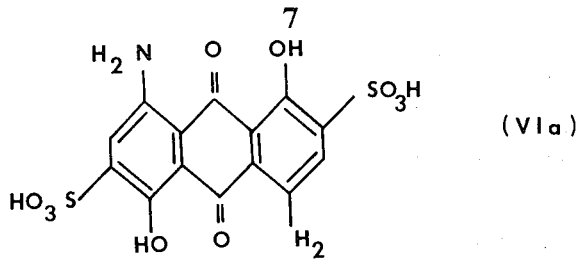

(VIa)

with a compound of the formula VIb

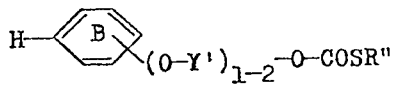  (VIb)

to give a monosulphonated anthraquinone compound of the formula VIc

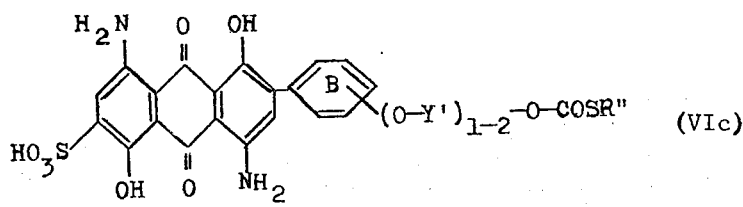 (VIc)

splitting off the sulphonic acid group in this monosulphonated anthrawuinone compound by reduction, and optionally, in the resulting compound, converting the $NH_2$ groups into $NHR'$ groups by treatment with alkylating agents, or by reacting an anthraquinone compound of the formula VId

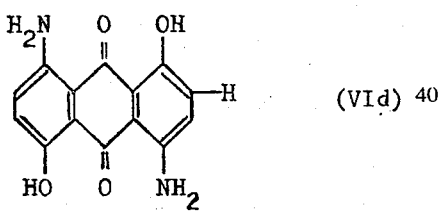 (VId)

to give the corresponding quinomine and then reacting this with a compound of the formula VIe.

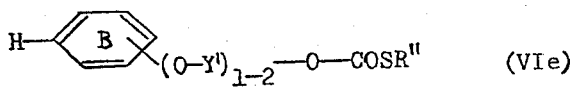 (VIe)

wherein R″, B, and Y′ have the indicated meanings, and optionally, in the resulting compound, converting the $NH_2$ groups into $NHR'$ groups by treatment with an alkylating agent.

Also preferred, however, is a process for the manufacture of anthraquinone compounds of sparing aqueous solubility, of the formula VII

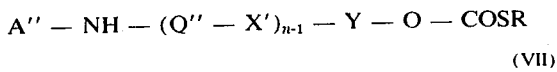

(VII)

wherein A″ represents an α-anthraquinonyl radical which contains in the β-positions hydrogen, halogen, or a group which is bonded to the anthraquinonyl radical via an aliphatic carbon atom, a carbon atom to which are bonded divalent and/or trivalent heteroatoms, or via a heteroatom, Q″ represents an optionally substituted arylene radical, X′ represents the direct bond, a heteroatom or a heterogroup, and n is 1 or 2 and Y and R have the meanings given hereinbefore, which process consists in reacting a compound of the formula VIIa (=formula Ib)

 (VIIa)

in which Hal represents chlorine or bromine, with a compound of the formula VIIb

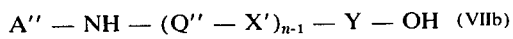 (VIIb)

or, if n is 2, in reacting a compound of the formula VIIc

 (VIIc)

in which V′ represents a replaceable substituent, with an amine of the formula VIId

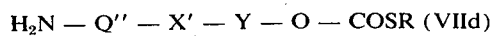

The anthraquinone compounds of the formula VIIb which can be used as starting materials can belong both to the series of the actual anthraquinonyl compounds and to that of the higher condensed derivatives, for example to the group of the anthrapyridinyl, anthraprimidinyl, pyrazolanthronyl, isothiazolanthronyl, and thiopheneanthronyl compounds.

As halogen, the anthraquinonyl radical A″ can carry in the β-positions e.g., fluorine, chlorine, or bromine. As examples of groups in the β-position bonded via an aliphatic carbon atoms to the anthraquinonyl radical A″ there may be cited lower alkyl groups which are optionally substituted to phenyl, hydroxyl, or the group —O—COOR, for example the methyl, benzyl, hydroxymethyl, or ROOC—O-methyl group. Examples of groups which are bonded to the anthraquinonyl radical via a carbon atom to which are bonded divalent and/or trivalent heteroatoms are the cyano group, a carboxylic amide group which is optionally substituted by lower alkyl groups or a carboxylic acid ester group, for example a lower carbalkoxy group, e.g., the carbomethoxy, carboethoxy, carboisopropoxy or carbobutoxy group, Examples of substituents which are bonded to the anthraquinonyl radical via a heteroatom are ether groups, for example lower alkoxy groups or the phenoxy group, thioether groups, for example lower alkylthio or phenylthio groups, lower alkylsulphonyl groups, sulphonic acid ester groups, for example lower alkoxysulphonyl groups or sulphonic acid amide groups which are optionally substituted by lower alkyl groups.

Besides the α-amino substituents according to the definition and the monovalent substituents in th β-position the anthraquinone nucleus can contain further substituents in the α-position, for example hydroxyl groups, nitro groups, primary amino groups or secondary amino groups which are substituted, e.g., by a lower alkyl group, for example the methyl, isopropyl, or isobutyl group, a cycloalkyl group, e.g., the cyclohexyl group, an aryl group, e.g., the phenyl, toluyl, 2,4,6-trimethylphenyl, phenoxyphenyl or phenylazo group, as well as by a further $RSOC-O-Y-(X-Q)_{n-1}$ group.

As an arylene radical, $Q''$ represents in particular a phenylene radical which is optionally substituted by halogen, lower alkyl or lower alkoxy groups, or also represents a phenoxyphenylene or phenylene-azo group.

If $X'$ represents a heteroatom it is sulphur or, preferably, oxygen. If $X'$ is a heterogroup it is, for example, a

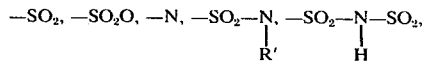

or CONH group (wherein $R'$ represents hydrogen or a lower alkyl radical).

The alkylene group Y contains preferably 4 carbon atoms and can be straight-chain or branched; in the former case it is preferably the 1,2-ethylene, 1,3-propylene, or 1,4-butylene group, and in the latter the 2-methyl-1,3-propylene, or 2,2-dimethyl-1,3-propylene group. If it is substituted by a hydroxyl group, the alkylene group Y is in particular the hydroxy-1,3-propylene group; if it is interrupted by oxygen, it represents preferably the diethyleneoxy or dipropyleneoxy group.

If R is an aliphatic radical it is, for example, a straight-chain or branched, optionally substituted alkyl or alkenyl group (in the latter case in particular a $\Delta^2$—alkenyl group) with preferably from 1 to 5 carbon atoms. These aliphatic radicals can contain as substituents, e.g., halogens, for example fluorine, chlorine, or bromine, or a lower alkoxy group as well as a carbocyclic ring of particularly aromatic character, for example the phenyl radical, or heterocyclic rings, for example the thienyl-(2), furyl-(2), or tetrahydrofuryl-(2) radical.

Examples of cycloaliphatic radicals R are cycloalkyl groups with 5- or 6-membered rings an especially the cyclohexyl or methyl-cyclohexyl group.

If R represents an aromatic radical it belongs in particular to the benzene series; it can contain customary non-iogenic ring substituents. Examples of such substituents are halogens, e.g., fluorine, chlorine, or bromine, nitro groups, lower alkyl or lower alkoxy groups.

The majority of the starting materials of the formula VIIb are known or can be manufactured by methods known per se, for example by reaction of an α-haloanthraquinone of the formula

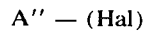

wherein $A''$ has the meaning given for the formula VII and Hal represents chlorine or bromine, with an amine of the formula $$H_2N - (Q''-X')_{n-1} - Y - OH,$$

wherein $Q''$, $X'$, Y, and $n$ have the meanings given for the formula VII.

As examples of α-haloanthraquinones there may be cited: 1-amino-2,4-dibromo-anthraquinone, 1-methylamino-4-bromo-anthraquinone, 1-isopropylamino-4-bromo-anthraquinone, 1-cyclohexylamino-4-bromo-anthraquinone, 1-phenylamino-4-bromo-anthraquinone, 1-(2',4',6'-trimethylphenylamino-4-bromo-anthraquinone. As examples of amines of the formula V there may be cited ethanolamine, 1,3-propanolamine, 1-amino-2-, 1-amino-3- or 1-amino-4- β-hydroxyethoxy-benzene, or 1-amino-4-β,γdihydroxypropoxybenzene, 1-amino-benzene-2-, 1-amino-benzene-3-, 1-amino-benzene-4-carboxylic acid-β-hydroxyethyl-amide, 1-amino-benzene-2-, 1-amino-benzene-3or 1-amino-benzene-4-sulphonic acid-β-hydroxyethyl-amide.

The halogen-substituted formic acid thioesters of the formula VIIc used as starting materials are for the most part known. Exemplary thereof are: 1-amino-4-bromo-anthraquinone, 1-amino-4-chloro-anthraquinone, 1-amino-4-hydroxy-anthraquinone, 1-amino-4-nitro-anthraquinone, 1-amino-4-methoxy-anthraquinone, or 1-amino-2-carbomethoxy-4-chloro-anthraquinone.

The amines of the formula VIId to be reacted with these compounds of the formula VIIc can be manufactured by methods known in the art, for example by reaction of a nitro compound of the formula

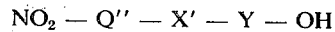

wherein $Q''$, $X'$, and Y have the meanings given for the formula VII, with a halogen-substituted formic acid thioester of the initially cited formula Ib, the reaction being carried out as described hereinbefore, and with subsequent reduction of the nitro to the amino group.

Starting materials of the formula VIIc, in which $V'$ represents the hydroxyl group as replaceable substituent, are reacted with the amines of the formula VIId advantageously in the presence of boric acid or the alkali salts thereof. If amines of the formula VIId which are further substituted in both ortho-positions are used, it is advisable to use simultaneously with boric acid a 1,3-alkane-diol which forms a cyclic ester with the boric acid, or a 1,3-alkane-diol-boric acid ester.

If an anthraquinone compound of the formula VIIc is used as starting material, wherein $V'$ represents halogen, especially chlorine or bromine, as replaceable substituent, the process is carried out with advantage in the presence of copper compound, e.g., copper-(I)-chloride, and an acid neutralising agent, and advantageously at elevated temperature. As acid neutralising agent there is used in particular an excess of the amine of the formula VIId, optionally together with an alkali metal salt of a lower fatty acid or of carbonic acid, e.g., sodium or potassium acetate, or sodium bicarbonate or sodium carbonate, or with an alkali hydroxide, e.g., sodium or potassium hydroxide, or also magnesium oxide.

The reaction of the starting materials of the formula VIIc, in which $V'$ represents a nitro or a methoxy group as replaceable substituent, with the amines of the formula VIId is effected e.g., with an excess of amine in the melt as about 100°–250°C, but preferably in an organic solvent which boils between 110°–220°C. Suitable solvents are, for example, optionally halogenated or nitrated aromatic hydrocarbons, e.g., xylenes, or monochlorobenzene or dichlorobenzene, or nitrobenzene, also alcohols, for example alkanols with at least 4 carbon atoms, e.g., butanol or amyl alcohol, or alkylene glycols and the monoalkyl ethers thereof. The preferred solvent is nitrobenzene.

Preferred anthraquinone dyestuffs of the formula VII which are distinguished by very good affinity, levelling power and build-up, as well as by good fastness to sublimation and light on polyethylene glycol terephthalate fibres, correspond to the formula VIII

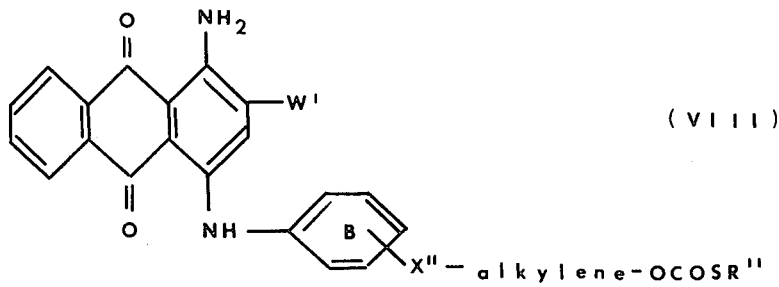

(VIII)

wherein W' represents halogen, for example chlorine or bromine, the cyano group, a lower alkyl group, a carboxylic or sulphonic acid amide group which is optionally substituted by lower alkyl groups, a lower carbalkoxy group or a lower alkylsulphonyl group, X'' represents the direct bond, oxygen, the —NH, —CONH or —SO$_2$ group, "alkylene" represents a lower alkylene group, and R'' represents a lower alkyl group or a phenyl radical which is optionally substituted by halogen or lower alkyl groups, and the benzene ring B is optionally further substituted by halogen, lower alkyl or lower alkoxy groups.

Further anthraquinone dyestuffs according to the invention which are also distinguished by good affinity and levelling power as well as by good fastness to sublimation of the dyeings produced therewith on polyester, are those of the formula IX

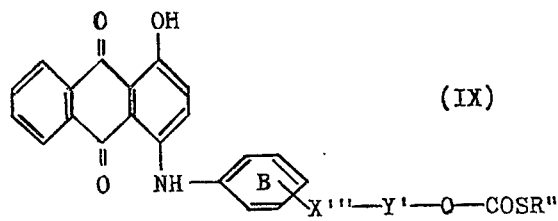

(IX)

wherein X''' represents the direct bond, oxygen, or the —SO$_2$NH group, Y' represents a lower alkylene group which is optionally interrupted by an oxygen atom, and R'' and the ring B have the meanings already given for the formula VIII, and those of the formula X

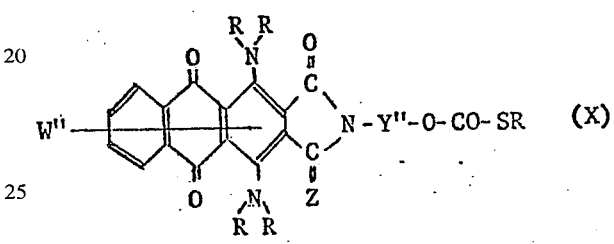

(X)

wherein $R_1'''$, $R_2'''$, $R_3'''$, and $R_4'''$ represent lower alkyl groups or, preferably, hydrogen atoms, W'' represents a halogen atom, a methyl group or, preferably, a hydrogen atom, Z represents a group of the formulae =O or =NH, and Y represents an alkylene radical which is optionally interrupted by an oxygen atom and which can be substituted by a hydroxyl group. The dyestuffs of the formulae VIII and IX are manufactured according to the invention by reacting a compound of the formula VIIIa

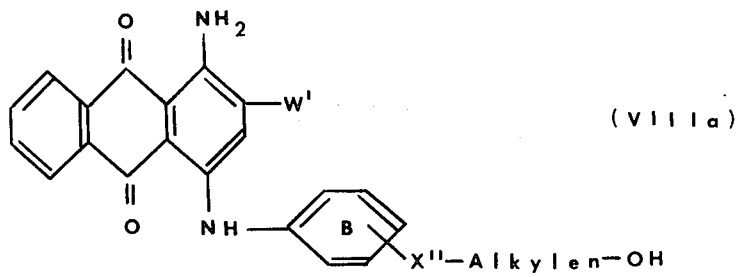

(VIIIa)

or of the formula IXa

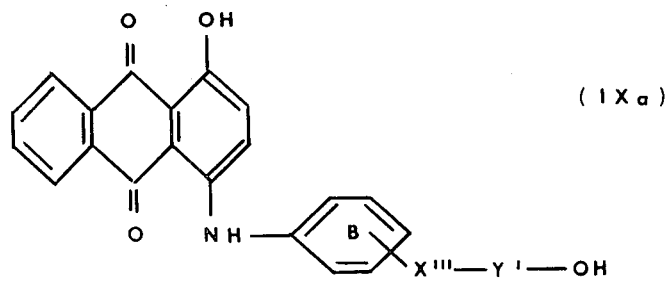

(IXa)

with a compound of the formula Ib

Hal — COSR (Ib).

The dyestuffs of the formula X are obtained in analogous manner from the hydroxyl compounds.

The new anthraquinone dyestuffs of the formula I are yellow to strongly coloured crystalline substances of sparing aqueous solubility. They can be obtained pure (by ascertainment of their melting point) by recrystallisation from organic solvents; however, a purification is in general unnecessary for their use in dyeing.

They are suitable for dyeing hydrophobic organic fibre material, for example material made from linear high molecular esters by the condensation of aromatic polycarboxylic acids with polyhdyric alcohols, for example polyethylene glycol terephthalate or poly-(1,4-cyclohexane-dimethylol-terephthal etc.), also for dyeing fibre material from cellulose-2 and 2½ acetate or cellulose triacetate. These dyestuffs can also be used for dyeing synthetic polyamide fibres, for example polyhexamethylene-adipic amide, polycaprolactam, or polyaminoundecanoic acid, as well as for dyeing polyolefins, especially polypropylene fibres, and for spin dyeing polyamide. Depending on their composition, they are also suitable for colouring or pigmenting lacquers, oils, and waxes, as well as cellulose derivatives, especially cellulose esters, e.g., cellulose acetate.

The cited fibre materials are preferably dyed with the anthraquinone dyestuffs of sparing aqueous solubility according to the invention from aqueous dispersion. It is therefore advisable to finely divide the end products of the formula I which are used as disperse dyestuffs with dispersing agents and possibly other grinding assistants.

Suitable anionic dispersing agents are, for example, the alkylarylsulphonates, the condensation products of formaldehyde with naphthalenesulphonic acid, ligninsulphonates. Suitable non-ionogenic dispersing agents are, for example, the fatty alcohol or alkylphenyl-polyglycol ethers with higher alkyl radical.

The polyester fibres are dyed from aqueous dispersion with the dyestuffs of sparing aqueous solubility according to the invention by the conventional dyeing methods for polyester materials. Polyesters of aromatic polycarboxylic acids with polhydric alcohols are dyed preferably at temperatures of over 100°C under pressure. However, the dyeing can also be carried out at the boiling point of the dyebath in the presence of dyestuff carriers, for example polyphenoly, polychlorobenzene compounds or similar assistants, or also by the thermosol method, i.e., padding with subsequent aftertreatment with the application of heat, for example thermosetting, at 180°–210°C, Cellulose-2½ acetate fibres are dyed preferably at temperatures of 80°–85°C, whereas cellulose triacetate fibres and synthetic polyamide material are dyed advantageously at the boiling point of the dyebath. The use of dyestuff carriers is superfluous in dyeing cellulose-2½ acetate or polyamide fibres. Anthraquinone dyestuffs according to the invention can also be used for printing the cited materials by the customary methods.

The anthraquinone dyestuffs of the formula I which can be used as disperse dyestuffs become very firmly attached to the hydrophobic organic fibre material cited hereinbefore, especially to polyethylene glycol terephthalate fibres, and produce thereon strong yellow, orange, red, violet, blue and green dyeings which have very good fastness to light, washing, rubbing, perspiration, sublimation, solvents, and decatising. Mixtures of anthraquinone dyestuffs according to the invention also have very satisfactory behavioural properties in this respect.

Furthermore, anthraquinone dyestuffs according to the invention can also be used successfully in admixture with other disperse dyestuffs which are fast to sublimation for dyeing material by the pad/heat-setting process. It is also particularly noteworthy that dyestuffs of the formula I produce level dyeings in the coluration of closely woven polyester fabrics or tightly plied polyester yarns. In addition, the new dyestuffs of the formula I also have the valuable property of making it possible to produce on texturised polyester fibres, e.g. "Crimplene," very full, non-stripy dyeings which have good fastness properties, in particular fastness to light and sublimation. The new anthraquinone dyestuffs also have good stability to liquor and long boiling.

The invention is illustrated, but not limited, by the following Examples.

EXAMPLE 1

32.7 parts of 1-amino-2-β-hydroxyethoxyethoyx-4-hydroxyanthraquinone are dissolved at 50°C in 300 parts of pyridine. The deep red solution is cooled rapidly to 0°–10°C and then, while stirring vigorously, treated dropwise within 1 hour with 34.5 parts of chlorothioformic acid-S-phenyl ester. The reaction is terminated after a further hour at this temperature. The reaction product of the formula

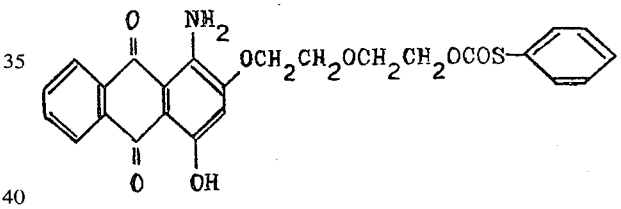

precipitates in crystalline form on stirring the solution with 300 parts of methyl alcohol at 20°C. It is filtered off, washed with methyl alcohol, and dried.

Cellulose diacetate and cellulose triacetate fibres, and especially polyethylene glycol terephthalate fibres, are dyed in very pure and level red shades in the aqueous dispersion of this finely divided dyestuff. The dyeings have very good fastness to light, sublimation, and rubbing.

EXAMPLE 2

40.6 parts of 1,5-dihydroxy-4,8-diamino-β-(4'-β-hydroxyethoxy)-phenylanthraquinone are stirred homogeneously in 400 parts of N,N-dimethyl formamide. After addition of 10.1 parts of triethylamine there are added dropwise to this susepnsion 24.9 parts of chlorothioformic acid-S-ethyl ester at 0°–5°C within half an hour. After 2 further hours at this temperature the reaction mixture is diluted with 200 parts of ethyl alconol, whereupon the dyestuff of the formula

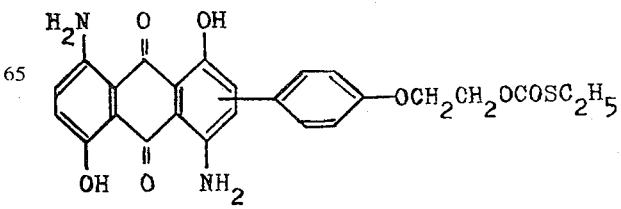

precipitates in fine form. It is filtered off, washed with ethyl alcohol, and dried. The starting compound was obtained by addition of β-hydroxyethoxyphenol to 1,5-dihydroxy-4,8-diamino-anthraquinone (procedure of German Pat. Nos. 445,269; 446,583; and 456,235; so-called Schmidt reaction; cf., also Veukataraman, The Chemistry of Synthetic Dyes, Vol. III, page 407, lines 1–2, New York 1970).

Polyethylene glycol terephthalate fibres are dyed in clear blue shades in the aqueous dispersion of the finely divided dyestuff. The dyeings have very good fastness to light, wet treatment, and sublimation.

By using equivalent amounts of anthraquinone compound listed in column II of the following Table instead of the 40.6 parts of the above anthraquinone starting compound, and equivalent amounts of the halogen-substituted thioformic acid ester listed in column III instead of that used in the foregoing Example, and by otherwise carrying out the same procedure as described therein, there are obtained dyestuffs which dye polyethylene glycol terephthalate fibres in the shades which are indicated in column IV of this Table and which are also fast to light and sublimation.

| I No. | II Anthraquinone Compound | III Halogen-substituted thioformic acid ester | IV Shade on polyethylene glycol terephthalate fibres |
| --- | --- | --- | --- |
| 1 | 1-amino-4-hydroxy-2-(β-hydroxyethoxy)anthraquinone | $ClCOSC_4H_9$ | red |
| 2 | 1-amino-4-hydroxy-2-(β-hydroxyethoxy)anthraquinone | $ClCOSC_2H_5$ | red |
| 3 | 1-amino-4-hydroxy-2-(β-hydroxyethylthio)anthraquinone | $ClCOSC_3H_7$ | deep purplish red |
| 4 | 1-hydroxy-4-[4-(β-hydroxyethoxy)anilino]anthraquinone | $ClCOS$—C$_6$H$_4$—$CH_3$ | violet |
| 5 | 1-hydroxy-5-nitro-8-hydroxy-4-[4-(β-hydroxyethylamino)anilino]anthraquinone | $ClCOSC_2H_5$ | blue |
| 6 | 1,5-dihydroxy-4,8-diamino-2-(β-hydroxyethylthio)anthraquinone | $BrCOSC_2H_5$ | blue |

| I No. | II Anthraquinone Compound | III Halogen-substituted thioformic acid ester | IV Shade on polyethylene glycol terephthalate fibres |
|---|---|---|---|
| 7 | (1,4-dihydroxy-anthraquinone with NH–C₆H₄–OCH₂CH₂OH substituent) | ClCOSC₂H₅ | reddish violet |
| 8 | (benzanthrone with SCH₂CH₂OH substituent) | ClCOS–C₆H₁₁ (H) | greenish yellow |
| 9 | (anthraquinone with N=N, SCH₂CH₂OH and NH₂ substituents) | ClCOSCH(CH₃)₂ | greenish yellow |
| 10 | (1-amino-4-anilino-anthraquinone with 2-CONHCH₂CH₂CH₂OH) | ClCOSCH₂CH(CH₃)₂ | blue |
| 11 | (1-amino-anthraquinone with 2-COOCH₂CH(OH)CH₃) | ClCOS–C₆H₄–Cl | red |

EXAMPLE 3

35.1 g of 1,4-diaminoanthraquinone-2,3-dicarboxylic acid-β-hydroxyethyl-imide are stirred in 300 ml of pyridine at 50°C and the homogeneous suspension is subsequently cooled to 0°–10°C. At this temperature 25 g of chlorothioformic acid-S-ethyl ester are added dropwise within 40 minutes and the reaction mixture is thereafter stirred for 1 hour at about 10°C.

Upon addition of 150 ml of water the dyestuff of the formula

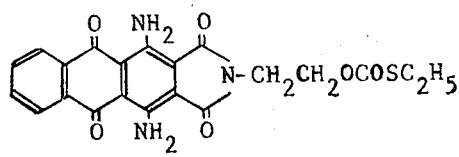

precipitates in fine form. It is filtered off, washed with 50% aqueous pyridine and with water, and dried.

Polyethylene terephthalate fibres are dyed in very pure level turquoise blue shades from the aqueous dispersion of the finely divided dyestuff. The dyeings have outstanding fastness to light and sublimation.

A dyestuff which dyes polyethylene terephthalate in very similar fast turquoise blue shades is obtained by replacing the 25 g of chlorothioformic acid-S-ethyl ester in the above Example by an equivalent amount of chlorothioformic acid-S-n-butyl ester.

EXAMPLE 4

35 g of 1-imino-2-β-hydroxyethyl-3-oxo-4,7-diamino-5,6-phthaloyldihydroisoindole are stirred homogeneously in 200 ml of 3-picoline for 1 hour at 40°–50°C. The mixture is cooled to 10°C, then 22.4 g of chlorothioformic acid-S-ethyl ester are added dropwise thereto over the course of 1 hour while stirring vigorously. Stirrings is continued for half an hour at 20°–25°C.

The resulting dyestuff of the formula

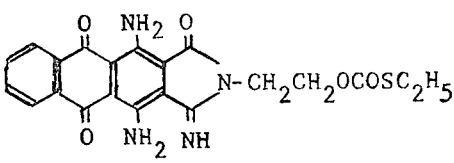

is precipitated by addition of 300 ml of methanol in finely crystalline form. It is then filtered off, washed with methanol and water, and dried. Polyethylene terephthalate fabric is dyed in clear greenish blue shades of very good fastness to light, sublimation, and washing from the aqueous dispersion of the finely divided dyestuff.

Very similar clear greenish blue dyestuffs are obtained by substituting for the 35 g of 1-imino-2-β-hydroxyethyl-3-oxo-4,7-diamino-5,6-phthaloyldihydroisoindole in the above Example 36.4 g of 1-imino-2-β-hydroxypropyl-3-oxo-4,7-diamino-5,6-phthaloyldihydroisoindole or 39.4 g of 1-imino-2-β-hydroxyethoxyethyl-3-oxo-4,7-diamino-5,6-phthaloyldihydroisoindole and otherwise carring our the procedure as described therein.

We claim:
1. An anthraquinone dyestuff of the formula

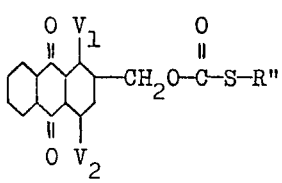

wherein $V_1$ represents hydroxyl or $-NH_2$, $V_2$ represents hydroxyl, phenylamino or phenylamino ring-substituted by one substituent selected from chlorine and $C_1-C_4$-alkoxy or by one to three lower alkyl, and R'' represents $C_1-C_4$-alkyl, phenyl or phenyl substituted by one or two substituents selected from chlorine and lower alkyl.

2. An anthraquinone dyestuff of the formula

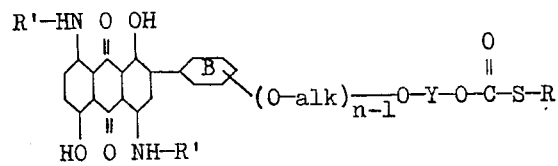

wherein R' represents hydrogen or lower alkyl "alk" represents lower alkylene, n represents 1 or 2, Y is lower alkylene or 2-hydroxy-1,3-propylene, R is
a. lower alkyl or lower alkenyl,
b. lower alkyl substituted by chlorine or bromine,
c. cyclohexyl,
d. phenyl, or
e. phenyl substituted by one or two substituents selected from chlorine and lower alkyl and the ring B is unsubstituted or is substituted by one substituent selected from chlorine and lower alkyl.

3. An anthraquinone dyestuff of the formula

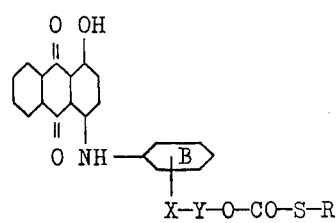

wherein X is $-SO_2-NH-$, $-SO_2-O-$, $-SO_2-$ and $-S-$, R is $C_1-C_5$-alkyl, cyclohexyl, phenyl or phenyl substituted by chlorine, bromine, $C_1-C_4$-alkyl or $C_1-C_4$-alkoxy, Y is $C_1-C_4$-alkylene, $-CH_2CH_2-O-CH_2CH_2-$, or $-CH_2CH_2CH_2-O-CH_2CH_2CH_2$ and B may be substituted by chlorine, bromine, $C_1-C_2$-alkyl or $C_1-C_2$-alkoxy.

4. An anthraquinone dyestuff of the formula

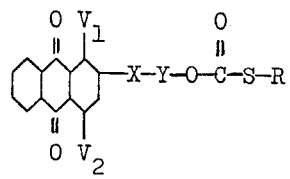

wherein $V_1$ represents hydroxyl or $-NH_2$, $V_2$ represents hydrogen, hydroxyl, cyclohexylamino, phenylamino, or phenylamino ring-substituted by one substituent selected from chlorine, $C_1-C_4$-alkoxy or by one to three $C_1-C_4$-alkyl, represents oxygen, sulfur, $-COO-$, $-CONH-$, $-(O-alkylene)_{1-3}$, $-O-$, $-O$-ethylene$-S-$, $-S$-alkylene$-O-$ $-O$-methylene-phenylene-,

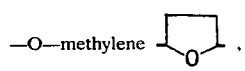

$-O$-phenylene-, $-S$-phenylene-, $-O$-phenylene-$O-$, $-O$-alkylene-$O$-phenylene-$O-$, $-COO$-alkylene-$O-$, $-SO_2-$, $-SO_2-O-$ or $-SO_2NH-$ wherein alkylene has up to 4 carbon atoms, represents alkylene of up to 4 carbon atoms or hydroxyalkylene of up to 4 carbon atoms, R represents alkyl of up to 5 carbon atoms, chloroalkyl of up to 5 carbon atoms, bromoalkyl of up to 5 carbon atoms, cyclohexyl, methylcyclohexyl, phenyl, phenyl substituted by chlorine or lower alkyl, or alkenyl of up to 5 carbon atoms, X represents oxygen, sulphur, $-CONH-$, $-SO_2NH-$ or $-O$-alkylene-$O-$, wherein the alkylene moiety has at most 4 carbon atoms, and Y represents lower alkylene.

5. An anthraquinone dyestuff of the formula

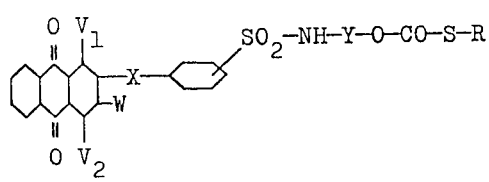

wherein $V_1$ represents hydroxyl or $-NH_2$, $V_2$ represents hydrogen, hydroxyl, $-NH_2$, lower alkylamino, cyclohexylamino, phenylamino, phenoxyphenylamino, phenylazophenylamino or phenylamino ring-substituted by chlorine, lower alkyl or lower alkoxy, X is oxygen or sulfur, Y is $C_1-C_4$-alkylene or

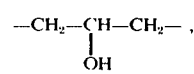

W is hydrogen, chlorine or X-phenylene-$SO_2NH-Y-O-CO-O-R$ and R is $C_1-C_4$-alkyl, $C_1-C_4$-alkyl substituted by chlorine or bromine, phenyl or phenyl substituted by $C_1-C_4$-alkyl, chlorine or bromine.

6. An anthraquinone dyestuff of the formula

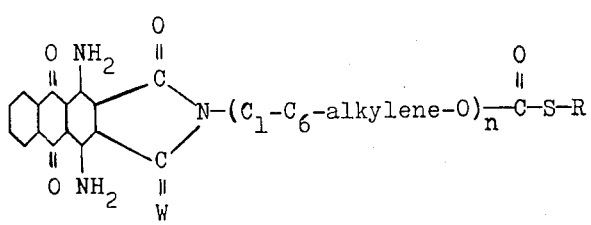

wherein R is $C_1$–$C_5$-alkyl, cyclohexyl, phenyl or phenyl optionally substituted by one or two substituents selected from $C_1$–$C_4$-alkyl, chlorine or $C_1$–$C_4$-alkoxy, $n$ is 1, 2 or 3 and W is =O or =NH.

7. An anthraquinone dyestuff of the formula

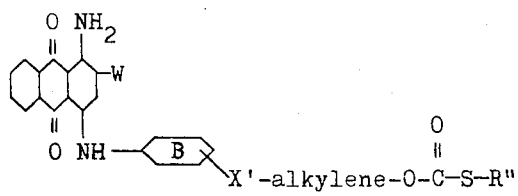

wherein W represents chlorine, bromine, cyano, lower alkyl, phenyl lower alkyl, lower alkoxycarbonyl, lower alkylsulfonyl or $$Z-N\begin{matrix}R_1\\R_2\end{matrix}$$

wherein Z represents —CO— or —$SO_2$— and $R_1$ and $R_2$ each independently of the other represent hydrogen or lower alkyl, X' represents the direct bond, oxygen, —NH—, —CONH— or —$SO_2NH$—, alkylene represents lower alkylene and R'' represents lower alkyl, lower alkyl monosubstituted by fluorine, chlorine or bromine, phenyl or phenyl monosubstituted by chlorine or methyl and wherein the ring B is not further substituted or is further monosubstituted by chlorine, lower alkyl or lower alkoxy.

8. An anthraquinone dyestuff according to claim 2 of the formula

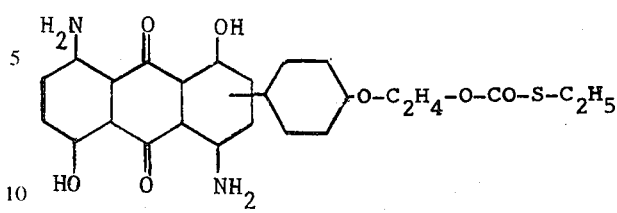

9. An anthraquinone dyestuff according to claim 4 of the formula

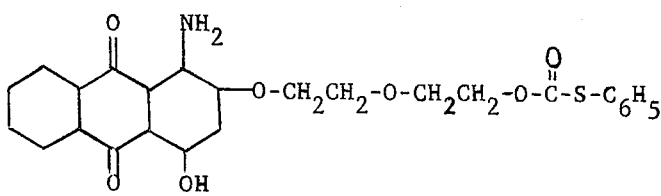

10. An anthraquinone dyestuff according to claim 6 of the formula

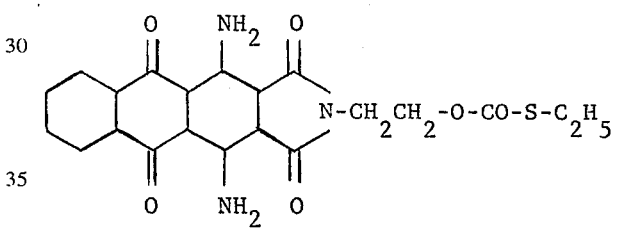

11. An anthraquinone dyestuff according to claim 4 of the formula

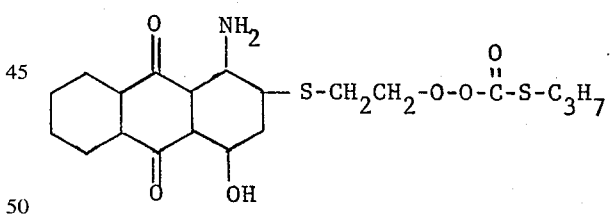

12. An anthraquinone dyestuff of the formula

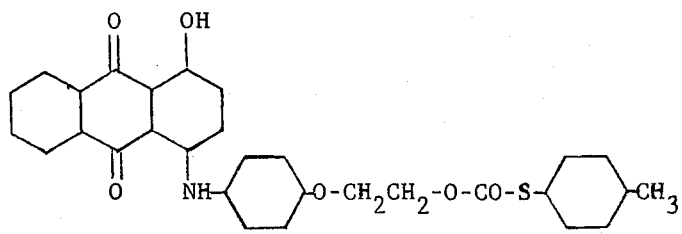

* * * * *